United States Patent
Kusano et al.

(10) Patent No.: US 6,796,125 B2
(45) Date of Patent: Sep. 28, 2004

(54) MASTER CYLINDER

(75) Inventors: Akihito Kusano, Toyota (JP); Satoshi Ishida, Chiryu (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/409,122

(22) Filed: Apr. 9, 2003

(65) Prior Publication Data

US 2003/0200750 A1 Oct. 30, 2003

(30) Foreign Application Priority Data

Apr. 25, 2002 (JP) ........................................ 2002-123445

(51) Int. Cl.$^7$ .............................................. F15B 7/08
(52) U.S. Cl. ...................................................... 60/588
(58) Field of Search .................................. 60/588, 589

(56) References Cited

U.S. PATENT DOCUMENTS 4,475,338 A * 10/1984 Gaiser .......................... 60/589
5,036,664 A * 8/1991 Camm .......................... 60/588

FOREIGN PATENT DOCUMENTS

JP          2-81268       6/1990
JP          7-51416       11/1995

* cited by examiner

Primary Examiner—F. Daniel Lopez
(74) Attorney, Agent, or Firm—Burns, Doane, Swecker & Mathis, L.L.P.

(57) ABSTRACT

A master cylinder includes a cylinder housing having a cylinder bore, a seal cup disposed inside the cylinder bore, and a piston slidably disposed in the cylinder bore in sliding contact with the seal cup and defining a pressure chamber in cooperation with the housing and the seal cup. The piston includes a connecting passage which fluidly connects the pressure chamber with an atmospheric pressure chamber when the piston is in a retracted position. The seal cup cuts off fluid communication between the pressure chamber and the atmospheric pressure chamber through the connecting passage when the piston moves in its axial direction by a prescribed distance from its retracted position. The connecting passage is a stepped hole having a first end portion with a small diameter which communicates with the pressure chamber and a second end portion with a large diameter which opens onto an outer peripheral surface of the piston. The cross-sectional area of the first end portion is such as to produce a throttling effect.

4 Claims, 2 Drawing Sheets

MASTER CYLINDER

BACKGROUND OF THE INVENTION

1. Field of the Invention

The present invention relates to a master cylinder. The master cylinder is suitable for but not limited to use in a brake apparatus for an automotive vehicle.

2. Description of the Related Art

One type of master cylinder which has been proposed in the past has a seal cup secured inside a cylinder bore of a cylinder housing. A piston which passes through the seal cup is disposed inside the cylinder housing so as to be able to slide in the axial direction of the piston. When the piston is in a retracted position, a pressure chamber which is formed by the cylinder housing, the seal cup, and the piston communicates with an atmospheric pressure chamber through a connecting passage formed in the piston. When the piston moves by a prescribed amount from the retracted position in the forward direction, communication between the connecting passage and the atmospheric pressure chamber is cut off by the seal cup. Examples of such a master cylinder are disclosed in Japanese Utility Model Application Laid-Open (kokai) No. Hei 2-81268 and Japanese Utility Model Publication (kokoku) No. Hei 7-51416.

When the piston of such a master cylinder is in its retracted position, the connecting passage formed in the piston communicates between the pressure chamber and the atmospheric pressure chamber so that the pressure within the pressure chamber does not rise due to increases in temperature and other influences. In the master cylinder shown in Japanese Utility Model Application Laid-Open No. Hei 2-81268, the connecting passage in the piston is positioned such that when the piston is in its retracted position, the connecting passage communicates with the atmospheric pressure chamber to the rear of the seal cup so that the connecting passage is not shut off by the seal cup and members disposed to the rear of the seal cup. With such a structure, when the piston moves forwards from its retracted position, the idle portion of the stroke of the piston until the pressure in the pressure chamber increases is large, so it has the problem that the responsiveness at times of sudden operation of the master cylinder is poor.

With the master cylinder disclosed in Japanese Utility Model Publication No. Hei 7-51416, a seal portion which intimately elastically contacts the outer periphery of the piston is provided on the inner periphery of the end of an inner peripheral lip of the seal cup. A plurality of projections are provided on the low pressure side (the side of the atmospheric pressure chamber) of the seal portion. When the piston is in its retracted position, the connecting passage formed in the piston opens between the projections. In addition, in this master cylinder, the end of the inner peripheral lip of the seal cup contacts a groove surface (the end surface of a member which limits the forward movement of the seal cup), so free deformation of the inner peripheral lip in the radial direction of the piston is obstructed.

With such a structure, it is possible to decrease the above-described idle portion of the stroke (the portion of the stroke of the piston until the pressure in the pressure chamber is increased), so the responsiveness of the master cylinder at times of sudden operation can be improved. However, there are problems such as that a high degree of dimensional accuracy of each part is required to make the end of the inner peripheral lip of the seal cup contact the groove surface, it is necessary to provide a plurality of projections in the seal cup, formability of the seal cup becomes poor, costs increase, and free deformation of the inner peripheral lip in the radial direction of the piston is obstructed, so the sliding resistance at the start of movement of the piston becomes large.

SUMMARY OF THE INVENTION

The present invention was made in order to overcome the above-described problems. According to the present invention, a stepped hole is used as a connecting passage between a pressure chamber and an atmospheric pressure chamber of a master cylinder. An end of the stepped hole which opens onto the outer peripheral surface of a piston is given a large diameter, and an end of the stepped hole which always communicates with the pressure chamber is given a small diameter. The cross-sectional area in the small diameter portion of the stepped hole is selected so as to produce a throttling effect. In a preferred embodiment, the stepped hole comprises a small diameter portion which opens onto the pressure chamber at its inner end in the radial direction of the piston and a large diameter portion which is coaxially formed with respect to the small diameter portion and which opens onto the outer peripheral surface of the piston at its outer end in the radial direction of the piston. The stepped hole may be formed in the hollow end portion of the piston, with the small diameter portion of the stepped hole having an end opening onto the inner peripheral surface of the hollow end portion of the piston, and the large diameter portion of the stepped hole having an end opening onto the outer peripheral surface of the hollow end portion of the piston.

In a master cylinder according to the present invention, when the piston is in its retracted position, a pressure chamber and an atmospheric pressure chamber communicate through a stepped hole (a connecting passage) formed in the piston. The stepped hole formed in the piston opens onto the outer peripheral surface of the piston at its large diameter portion, so when the piston is in its retracted position, even when the center of the stepped hole is close to or overlaps the seal cup in the axial direction of the piston, the stepped hole communicates with the atmospheric pressure chamber with certainty. Therefore, in a state in which fluid communication between the pressure chamber and the atmospheric pressure chamber is guaranteed with certainty, the idle portion of the stroke of the piston until the pressure in the pressure chamber appropriately rises can be set to a small value.

In addition, the cross-sectional area of the passage in the small diameter portion of the stepped hole is set so as to produce a throttling effect, so when the piston rapidly moves from its retracted position in the direction of movement (forwards), even when the large diameter portion of the stepped hole communicates with the atmospheric pressure chamber, the pressure in the pressure chamber can be increased by the throttling effect. Accordingly, due to the synergistic effect of the ability to set the idle portion of the stroke of the piston to a small value and the ability to increase the pressure in the pressure chamber by the throttling effect, the responsiveness of the master cylinder during sudden operation can be increased.

In the master cylinder according to the present invention, the passage formed in the piston can be realized by a stepped hole, so it is unnecessary to modify the shape of the cylinder housing or to modify the shape of the seal cup. As a result, there are none of the various problems accompanying a modification of the shape of the cylinder housing or a modification of the shape of the seal cup, and the master cylinder can be easily and inexpensively realized. In addition, the inner peripheral lip of the seal cup is permitted to freely deform in the radial direction of the piston, so the sliding resistance of the piston and the seal cup can be reduced, and good operability can be maintained.

When carrying out the present invention, when the stepped hole formed in the piston comprises a small diameter portion which opens onto the pressure chamber at its inner end in the radial direction of the piston and a large diameter portion which is coaxially formed with the small diameter portion and which opens onto the outer periphery of the piston at its outer end in the radial direction of the piston, and particularly in the case in which the stepped hole is formed in a hollow end portion of the piston, the end of the small diameter portion of the stepped hole opens onto the inner peripheral surface of the hollow end portion of the piston, and the end of the large diameter portion of the stepped hole opens onto the outer peripheral surface of the hollow end portion of the piston, so it is possible to easily form the stepped hole by drilling or other method from the outer periphery of the piston, and the master cylinder can be inexpensively manufactured.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENT

Figure 1:
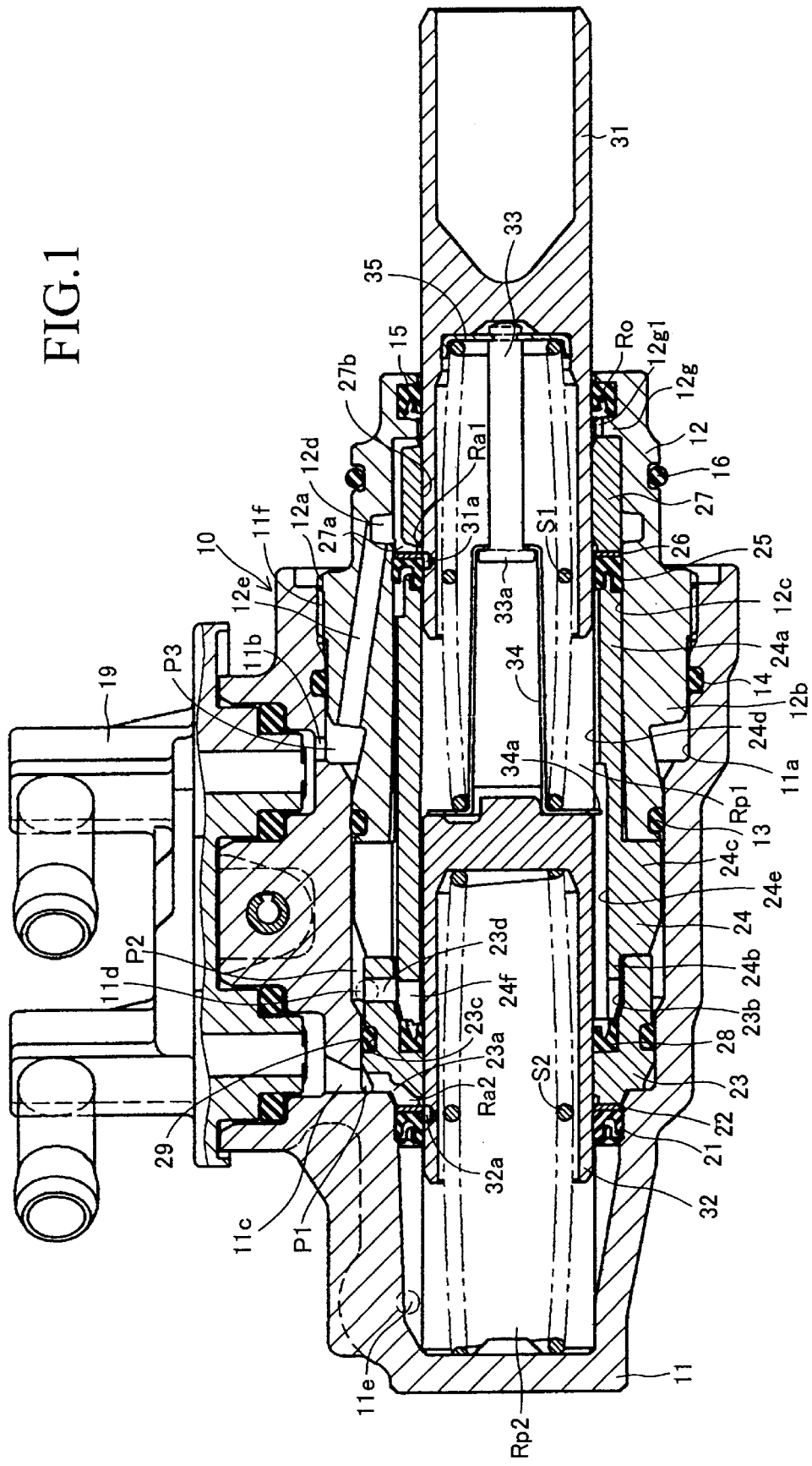
FIG. 1 is a longitudinal cross-sectional view of an embodiment of a master cylinder according to the present invention.

Below, an embodiment of a master cylinder according to the present invention will be explained while referring to the accompanying drawings. FIG. 1 shows an embodiment of a master cylinder according to the present invention. This master cylinder has a cylinder housing 10 comprising a body 11 and a cap 12 (also referred to as a cover), a seal cup 21, a spacer 22, a guide 23, a sleeve 24, a seal cup 25, a spacer 26, a guide 27, a first piston 31, and a second piston 32 assembled in the cylinder housing 10.

The body 11 has a stepped bore 11a which is open at its rear end (the right end in FIG. 1), reservoir connecting ports 11b and 11c fluidly connected by connectors 19 to a reservoir (an atmospheric pressure chamber omitted from the drawings), and discharge ports 11d and 11e fluidly connected by brake lines to wheel cylinders (also not shown in the drawings). An internally threaded portion 11f is formed at the open end of the bore 11a. The seal cup 21, which is annular, and the spacer 22 are coaxially fit in the bore 11a of the body 11. The seal cup 21 forms a liquid-tight seal for a second pressure chamber Rp2 which is formed between the body 11 and the second piston 32 and which communicates with the discharge port 11e.

Figure 2:
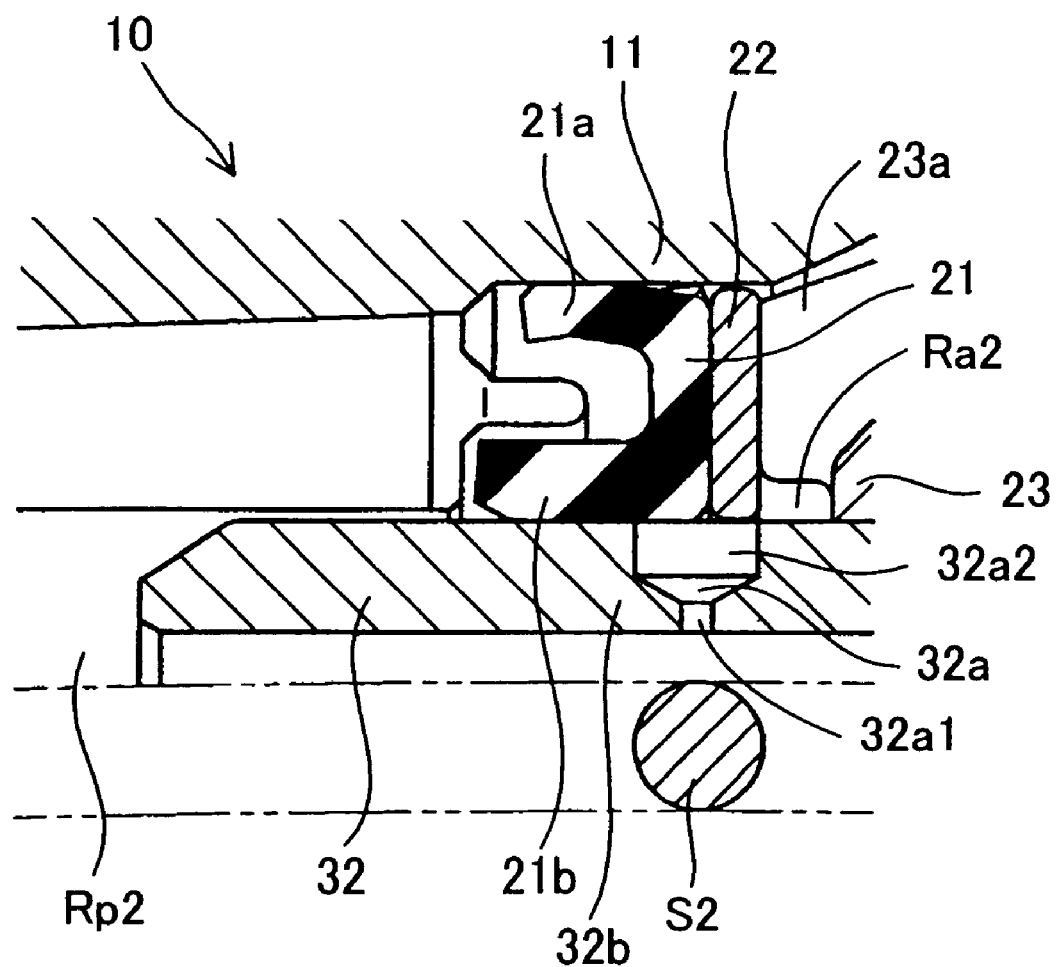
FIG. 2 is an enlarged cross-sectional view of one of the stepped holes of the embodiment of FIG. 1.

As shown in FIGS. 1 and 2, the seal cup 21 has a cup recess which opens in the forward direction (to the left in the figures). The seal cup 21 forms a liquid-tight seal between the inner periphery of the body 11 and the outer periphery of the second piston 32 with an outer peripheral lip 21a and an inner peripheral lip 21b, whereby the second pressure chamber Rp2 is formed in front of the seal cup 21, and a second atmospheric pressure chamber Ra2 is formed behind it. The outer peripheral lip 21a and the inner peripheral lip 21b each extend forwards. The front end of each lip is free in the axial direction of the second piston 32 and is not constrained and can freely flex in the radial direction of the second piston 32. The second atmospheric pressure chamber Ra2 always communicates with the reservoir.

The spacer 22 has an annular shape and is disposed between the seal cup 21 and the guide 23. The spacer 22 allows liquid to pass in the axial direction of the second piston 32 along the inner and outer peripheries of the spacer 22, and when pressure is generated in the second pressure chamber Rp2 formed ahead of the second piston 32 in the cylinder housing 10, the spacer 22 prevents a portion of the seal cup 21 from digging into a connecting groove 23a of the guide 23, which will be described later.

The cap 12 has an externally threaded portion 12a on the outer periphery of its midportion which threadingly engages with the internally threaded portion 11f of the body 11, and it has a cylindrical portion 12b which fits into the bore 11a of the body 11 and houses a small diameter rear cylindrical portion 24a of the sleeve 24. The cap 12 is installed on the body 11 in a liquid-tight manner by O-rings 13 and 14. The seal cup 21, the spacer 22, the guide 23, the sleeve 24, and other members which are coaxially fit inside the bore 11a of the body 11 are prevented from coming out of the bore 11a by the end surface of the cylindrical portion 12b. The seal cup 25, the spacer 26, the guide 27, and other members which are coaxially fit inside a stepped bore 12c of the cap 12 are prevented from coming out of the bore 12c by the step portion of the stepped bore 12c.

Like the seal cup 21, the seal cup 25 has an annular shape and has a cup recess which opens towards the front. By forming a seal in a liquid-tight manner between the inner periphery of the cap 12 and the outer periphery of the first piston 31 by an outer peripheral lip and an inner peripheral lip, the seal cup 25 forms a first pressure chamber Rp1 to its front and a first atmospheric pressure chamber Ra1 to its rear. The outer peripheral lip and the inner peripheral lip of the seal cup 25 each extend forward. The front end of each lip is free in the axial direction of the first piston 31 and is not constrained and can freely flex in the radial direction of the first piston 31. The first atmospheric pressure chamber Ra1 always communicates with the reservoir.

The spacer 26 has an annular shape and is disposed between the seal cup 25 and the guide 27. It permits liquid to pass along its inner and outer peripheries in the axial direction of the first piston 31. When pressure is generated in the first pressure chamber Rp1 formed in the cylinder housing 10 between both pistons 31 and 32, the spacer 26 prevents a portion of the seal cup 25 from digging into a connecting groove 27a of the guide 27, which will be described later.

An annular seal cup 15 is installed on the inner periphery of the rear end of the cap 12, and an O-ring 16 is mounted on the outer periphery of the rear end of the cap 12. An O-ring 13 is mounted in an annular groove provided in the outer periphery of the front end of the cap 12 and forms a liquid-tight seal between the inner periphery of the body 11 and the outer periphery of the cap 12. An O-ring 14 is mounted in an annular groove provided in the bore 11a of the body 11 to the rear of O-ring 13. It forms a gas-tight and liquid-tight seal between the inner periphery of the body 11 and the outer periphery of the cap 12.

The seal cup 15 is mounted in an annular groove provided in the cap 12 to the rear of the guide 27. It has a cup recess which opens to the front. It forms a gas-tight and liquid-tight seal between the inner periphery of the cap 12 and the outer periphery of the first piston 31. The O-ring 16 is mounted in an annular groove provided in the outer periphery of the rear of the cap 12. It forms a gas-tight seal between the housing (not shown) of a brake booster and the cap 12. The outer periphery of the rear end of the cap 12 has a hexagonal shape. The cap 12 is mounted on the body 11 by rotating the hexagonal portion with a tool.

The front guide 23 has a cylindrical shape. It includes the connecting grooves 23a, a stepped bore 23b, and an annular groove 23c. The guide 23 is fit in the bore 11a of the body 11. A plurality of the connecting grooves 23a are formed at the front end of the guide 23 at prescribed intervals in the circumferential direction of the guide 23. The connecting grooves 23a always communicate with the reservoir connecting port 11c through an annular passage P1 formed between the body 11 and the guide 23, and they can communicate with a return port 32a of the second piston 32 when the second piston 32 is in its retracted position (the position shown in FIG. 1) through a gap between the spacer 22 and the second piston 32.

The stepped bore 23b is formed in the inner periphery of the guide 23. The second piston 32 is supported by the small diameter portion of the stepped bore 23b so as to be able to slide in the axial direction of the second piston 32. An annular seal cup 28 and a front small diameter cylindrical portion 24b of the sleeve 24 are assembled in the large diameter portion of the stepped bore 23b. The seal cup 28 has a cup recess which opens in the rear direction. Its movement in the rear direction is restricted by the front end of the sleeve 24. It forms a liquid-tight seal between the inner periphery of the guide 23 and the outer periphery of the second piston 32. The annular groove 23c is formed in the outer periphery of the midportion of the guide 23, and an O-ring 29 is mounted in the groove 23c. The O-ring 29 forms a liquid-tight seal between the outer periphery of the guide 23 and the inner periphery of the body 11. The first pressure chamber Rp1 is defined by the O-ring 13, the O-ring 29, both seal cups 25 and 28, and other members.

The sleeve 24 is a cylindrical molded resin product having a rear small diameter cylindrical portion 24a, a front small diameter cylindrical portion 24b, and an intermediate large diameter cylindrical portion 24c. The rear small diameter cylindrical portion 24a is coaxially fit in the stepped bore 12c of the cap 12, the front small diameter cylindrical portion 24b is coaxially fit in the large diameter portion of the stepped bore 23b of the guide 23, and the intermediate large diameter cylindrical potion 24c is coaxially held between the guide 23 and the cap 12.

The sleeve 24 has a bore 24d, a stepped connecting groove 24e, and a notch 24f. The rear portion of the bore 24d supports the first piston 31 together with the bore 24b of the rear guide 27 so that the first piston 31 can slide in its axial direction. The front portion of the bore 24d supports the second piston 32 together with the small diameter portion of the stepped bore 23b of the front guide 23 so that the second piston 32 can slide in its axial direction.

The connecting groove 24e is formed in a straight line in the axial direction on the inner periphery of the sleeve 24. It always communicates with the first pressure chamber Rp1 formed between both pistons 31 and 32 and the cup recesses of both seal cups 25 and 28. The notch 24f is formed at the front of the sleeve 24, and it always fluidly connects the first pressure chamber Rp1 to the discharge port 11d through the connecting hole 23d provided in guide 23 and the annular passage P2 formed by the body 11, the cap 12, the guide 23, and the sleeve 24.

The rear guide 27 is a cylindrical member made from a phenolic resin. It is closely and coaxially fit in the stepped bore 12c of the cap 12. Its rearward movement is limited by contact with an annular flange 12g of the cap 12 provided between it and the seal cup 15. The flange 12g, which is integrally formed with the cap 12, extends radially inwards from the outer diameter of the seal cup 15. Its inner diameter is slightly larger than the inner diameter of the guide 27. The flange 12g has a notch 12g1 which communicates at its rear end with a liquid chamber Ro which is formed on the rear side of the flange 12g by the seal cup 15.

C-shaped connecting grooves 27a which extend from the outer periphery to both end surfaces of the guide 27 are formed by molding in the guide 27. Each connecting groove 27a comprises a front groove portion which is formed along the radial direction in the front end surface of the guide 27, an outer peripheral groove portion which is formed in the axial direction of the outer periphery of the guide 27, and a rear groove portion which is formed in the radial direction in the rear end surface of the guide 27. A plurality of the grooves 27a are formed at prescribed intervals in the circumferential direction.

The connecting grooves 27a always communicate with the reservoir connecting port 11b through the annular groove 12d and the connecting hole 12e formed in the cap 12, and the annular passage P3 formed between the body 11 and the cap 12, and they always communicate with the liquid chamber Ro formed by seal cup 15 through the notch 12g1 in the flange 12g. The grooves 27a can communicate with the return port 31a of the first piston 31 when the first piston 31 is in its retracted position (the return position shown in FIG. 1) through the gap between the spacer 26 and the first piston 31.

A liquid-tight seal is formed forward of the annular passage P3 between the body 11 and the cap 12 by the O-ring 13 mounted on the cap 12 to shut off fluid communication to the first pressure chamber Rp1, and a gas-tight and liquid-tight seal is formed to its rear between the body 11 and the cap 12 by the O-ring 14 mounted on the body 11 to shut off fluid communication to the atmosphere.

The first piston 31 extends into the cylinder housing 10 through the cap 12. The first piston 31 is supported by the bore 24d of the sleeve 24 and the bore 24b of the guide 27 so as to be able to slide in its axial direction. The first piston 31 is biased to the right in FIG. 1 by a first spring S1 disposed between it and the second piston 32. The amount by which the first piston 31 can move backwards with respect to the second piston 32 is restricted by a rod 33 and a retainer 34.

The rod 33 is coaxially disposed with respect to the first piston 31, and its rear end is rigidly secured to the first piston 31 by a holder 35. The rod 33 moves in its axial direction as a single body with the first piston 31. The retainer 34 is disposed between the first piston 31 and the second piston 32, and it acts as a spring retainer for the first spring S1 at the end of the first spring S1 adjoining the second piston 32. The retainer 34 has a projection 34a which extends in the radial direction and engages with the connecting groove 24e formed in the inner periphery of the sleeve 24. The rear end of the retainer 34 detachably engages with a head portion 33a of the rod 33 so as to enable the rod 33 to move towards the second piston 32 by disengagement of the head portion 33a of the rod 33 from the retainer 34.

The second piston 32 is coaxially disposed with respect to the first piston 31, and it is supported in the cylinder housing 10 by the bore 24d of the sleeve 24 and the small diameter portion of the stepped bore 23b of the guide 23 so as to be able to slide in its axial direction. The second piston 32 is biased to the right in FIG. 1 by a second spring S2 disposed between the second piston 32 and the body 11. The second piston 32 is also biased towards the left in FIG. 1 by the above-described first spring S1. The amount of backwards movement of the second piston 32 to the right in FIG. 1 is determined by the biasing forces of the two springs S1 and S2.

Each of the pistons 31 and 32 is equipped with a return port 31a and 32a, respectively, for providing fluid communication between one of the pressure chambers and the corresponding atmospheric pressure chambers. FIG. 2 is an enlarged cross-sectional view showing the structure of the return port 32a of the second piston 32. The return port 31a of the first piston 31 has a similar structure. Each return port 31a and 32a is formed in the hollow end portion (32b in the case of the second piston 32) of the corresponding piston 31 and 32. Each return port 31a and 32a is a stepped hole comprising a small diameter portion (32a1 for return port 32a) having a diameter of about 0.5 mm which communicates at its inner end in the radial direction of the piston with the inner peripheral surface of the hollow end portion (32b) of the corresponding piston 31 or 32, i.e., it communicates with the pressure chamber Rp1 or Rp2 of the corresponding piston. Each return port 31a and 32a also includes a large diameter portion (32a2 for return port 32a) having a diameter of approximately 2.0 mm which is coaxially formed with the small diameter portion (32a1) and opens at its outer end in the radial direction of the piston onto the outer peripheral surface of the hollow end portion (32b) of the corresponding piston 31 or 32. The cross-sectional area of the small diameter portion (32a1) of the stepped hole is selected so as to produce a throttling effect when the corresponding piston 31 or 32 rapidly moves in the direction of movement (forwards) from its retracted position.

In the master cylinder of this embodiment having the above-described structure, when each piston 31 and 32 is in its retracted position shown in FIG. 1, each pressure chamber Rp1 and Rp2 is fluidly connected with the corresponding atmospheric pressure chamber Ra1 and Ra2 through one of the return ports (stepped holes) 31a and 32a formed in the pistons 31 and 32. Therefore, in the state in which the master cylinder is mounted on a vehicle and the cylinder housing 10 is filled with brake fluid, if the first piston 31 is pushed to the left in FIG. 1 (forwards) and moves in its axial direction, when the return port 31a of the first piston 31 moves to the left past the seal cup 25, fluid communication between the first pressure chamber Rp1 and the first atmospheric pressure chamber Ra1 is cut off by the seal cup 25, so pressure is generated in the first pressure chamber Rp1.

At this time, the second piston 32 is pushed to the left in FIG. 1 and moves in its axial direction, and when the return port 32a of the second piston 32 moves to the left past the seal cup 21, fluid communication between the second pressure chamber Rp2 and the second atmospheric pressure chamber Ra2 is cut off by the seal cup 21, so pressure is generated in the second pressure chamber Rp2. Therefore, pressurized liquid is forced out from the first pressure chamber Rp1 through discharge port 11d (which is fluidly connected to wheel cylinders), and pressurized liquid is forced out from the second pressure chamber Rp2 through discharge port 11e (which is also fluidly connected to wheel cylinders) to produce a braking action.

In this embodiment, the return ports (stepped holes) 31a and 32a formed in the pistons 31 and 32 open onto the outer peripheral surface of the piston 31 and 32 at the large diameter portions (32a2) of the return ports, so when each piston 31 and 32 is in its retracted position, each return port (stepped hole) 31a and 32a can communicate with the corresponding atmospheric pressure chamber Ra1 or Ra2 with certainty, even when the center of each return port 31a and 32a is close to or overlapping the corresponding seal cup 21 and 25 in the axial direction of the pistons. Therefore, in a state in which fluid communication between the pressure chambers Rp1 and Rp2 and the atmospheric pressure chambers Ra1 and Ra2 is maintained with certainty, the idle portion of the stroke of each piston 31 and 32 until the pressure in the pressure chambers Rp1 and Rp2 is appropriately increased can be set to a small value.

In the small diameter portion (32a1) of each return port (stepped hole) 31a and 32a, the cross-sectional area is set so as to produce a throttling effect, so when each piston 31 and 32 rapidly moves from its retracted position in the direction of movement (forwards), even in a state in which the large diameter portion (32a2) of each return port (stepped hole) 31a and 32a communicates with the corresponding atmospheric pressure chamber Ra1 and Ra2, the pressure in each pressure chamber Rp1 and Rp2 can be increased by the above-described throttling effect. Accordingly, due to the synergistic effect of it being possible to set the idle portion of the stroke of each piston 31 and 32 to a small value and it being possible to increase the pressure in each pressure chamber Rp1 and Rp2 by the throttling effect, the responsiveness during sudden operation of the master cylinder can be increased.

In the master cylinder of this embodiment, the return ports (connecting passages) 31a and 32a formed in the pistons 31 and 32 can comprise stepped holes. Modifications of the shape of the cylinder housing 10 or modifications of the shape of the seal cups 21 and 25 are unnecessary, so there are none of the various problems accompanying modifications of the shape of the cylinder housing 10 or modifications in the shape of the seal cups 21 and 25, and it is possible to easily and inexpensively form the master cylinder. In addition, free deformation of the inner peripheral lip in the seal cups 21 and 25 is permitted in the radial direction of the pistons, the sliding resistance of each piston 31 and 32 and each seal cup 21 and 25 can be decreased, and good operability can be maintained.

In the master cylinder of this embodiment, the return ports (stepped holes) 31a and 32a formed in the hollow end portions (32b) of each piston 31 and 32 comprise a small diameter portion (32a1) opening onto the inner peripheral surface of the hollow end (32b) of each piston 31 and 32 at its inner end in the radial direction of the piston, i.e., opening onto the pressure chambers Rp1 and Rp2, and a large diameter portion (32a2) which is coaxially formed with the small diameter portion (32a1) and opens onto the outer peripheral surface of the hollow end portion (32b) of each piston 31 and 32 at its outer end in the radial direction of the piston. Therefore, the return ports (stepped holes) 31a and 32a can be easily formed by drilling or the like from the outer periphery of each piston 31 and 32. Each return port (stepped hole) 31a and 32a can be formed entirely by drilling, or the small diameter portion (32a1) can be formed by punching after the large diameter portion (32a2) has been formed by drilling.

In the above-described embodiment, the return ports (stepped holes) 31a and 32a of each piston 31 and 32 comprise a small diameter portion (32a1) and a large diameter portion (32a2) which are coaxially formed with each other, but they may also comprise a small diameter portion and a large diameter portion which are not coaxially formed with each other. In the above-described embodiment, the present invention was applied to a tandem-type master cylinder for a brake, but the present invention can be applied in the same manner or with suitable variations to other types of master cylinders (such as a single-piston master cylinder or a master cylinder for a clutch).

Obviously, numerous modifications and variations of the present invention are possible in light of the above teachings. It is therefore to be understood that within the scope of the appended claims, the present invention may be practiced otherwise than as specifically described herein.

What is claimed is:

1. A master cylinder comprising:

a cylinder housing having a cylinder bore;

a seal cup disposed inside the cylinder bore; and a piston slidably disposed in the cylinder bore in sliding contact with the seal cup and defining a pressure chamber in cooperation with the housing and the seal cup, the piston including a connecting passage which fluidly connects the pressure chamber with an atmospheric pressure chamber when the piston is in a retracted position, the seal cup cutting off fluid communication between the pressure chamber and the atmospheric pressure chamber through the connecting passage when the piston moves in its axial direction by a prescribed distance from its retracted position, wherein the connecting passage comprises a stepped hole having a first end portion with a small diameter which communicates with the pressure chamber and a second end portion with a large diameter which opens onto an outer peripheral surface of the piston, a cross-sectional area of the first end portion being such as to produce a throttling effect.

2. A master cylinder as claimed in claim 1 wherein the stepped hole comprises a small diameter portion which opens onto the pressure chamber at an inner end of the small diameter portion in the radial direction of the piston, and a large diameter portion which is coaxially formed with the small diameter portion and which opens onto the outer peripheral surface of the piston at an outer end of the large diameter portion in the radial direction of the piston.

3. A master cylinder as claimed in claim 2 wherein the stepped hole is formed in a hollow end portion of the piston, the small diameter portion of the stepped hole opens onto an inner peripheral surface of the hollow end portion of the piston, and the large diameter portion of the stepped hole opens onto an outer peripheral surface of the hollow portion end of the piston.

4. A master cylinder as claimed in claim 1 wherein the stepped hole is formed in a hollow end portion of the piston, the small diameter portion of the stepped hole opens onto an inner peripheral surface of the hollow end portion of the piston, and the large diameter portion of the stepped hole opens onto an outer peripheral surface of the hollow portion end of the piston.

* * * * *